United States Patent Office 3,114,304
Patented Dec. 17, 1963

3,114,304
COATING COMPOSITION FOR ASPHALTIC PAVING
John Delmonte, Glendale, Calif., assignor to Furane Plastics Incorporated, Los Angeles, Calif., a corporation of California
No Drawing. Filed Oct. 13, 1961, Ser. No. 144,824
12 Claims. (Cl. 94—7)

This invention relates to pavings and coating compositions therefor, and in particular to cold setting furane resin compositions for application as surface coatings on asphaltic or bituminous paving surfaces to prevent water penetration, and to reduce weathering and traffic erosion.

I have discovered that liquid furane resin, preferably partly polymerized to a somewhat viscous liquid, may be used as hardenable binders for mineral fillers in plastic coating compositions for paving surfaces, to improve the resistance to traffic and weather erosion. I have further discovered that the viscosity and plasticity of the uncured furane resin composition may be extended and enhanced by the addition of reinforcing powders and plasticizer-extender materials prior to the hardening of the coating.

It is therefore the principal object of this invention to provide a hardenable furane resin polymer bonded coating on pavings, particularly asphaltic type pavings, which greatly improves the resistance to traffic and weather erosion. Another object is to provide a paving having a strong wear-resistance exposed surface. Another object is to provide a method for forming such a pavement and coating.

The composition of this invention consists essentially of a mixture of liquid furane resin, a plasticizer-extender, a reinforcing mineral filler, and as a separate ingredient, an acidic curing agent. There may also be added after the acidified composition has been distributed as a coating on a pavement base, wear-resisting mineral particles which become partly or wholly buried in the coating. The paving base may be of any rigid permanent type such as cement or asphalt concrete, with or without an asphaltic or bituminous coating.

The preferred furane resin ingredient of the unset composition is a liquid polymer prepared from furfuryl alcohol and furfuraldehyde. By the term "furane resin polymer" there is meant the liquid state polymers formed by polymerization or reaction from furfuryl alcohol alone, furfuryl alcohol with aldehydes such as furfuraldehyde and formaldehyde, furfural with ketones such as acetonyl acetone, furfural with phenols, and furfuryl alcohol with urea. All of these may be used more or less interchangeably in the examples given.

The selected furane resin may be in liquid unreacted condition but it is preferred that the initial polymerization or reaction (prior to mixing in the other ingredients) be previously carried to a viscosity of 20 to 1000 centipoises. The plasticizer-extender and the reinforcing powder are mixed in either before or after an initial thickening of the furane liquid by polymerization.

The plasticizer-extender is selected from the group consisting of halogenated waxes, halogenated diphenyls, halogenated rubbers, and the tarry hydrocarbon residuum produced in the furfuraldehyde extractive purification of butadiene, or mixtures thereof. All of these are soluble in or compatible with the furane resin polymer liquids and all give plasticity to the coating composition, and may be used substantially interchangeably, in the required specific proportion to give the desired plasticity.

Viscosities in the plasticizer-extender higher than about 50,000 centipoises are difficult to disperse and dissolve, and therefore high viscosities but lower than about 50,000 centipoises are preferred. Materials known in the trade as "Arochlors" and "halowax" are satisfactory.

The reinforcing filler generally consists of inert material finer than 20 mesh, such as carbon black, finely divided silica, or finely pulverized other inert mineral powder, which includes graphite, clays, mica, ceramic waste powder, aluminum oxide, glass spheres, and talc. The reinforcing filler must be substantially unattacked by the acid curing agent. The addition of certain kinds of reinforcing powdered fillers particularly "C-Black" and "Cabosil" and other fine silicas and carbon blacks produces marked thixotropy in the composition, so that when applied in a manner to produce surface roughness, it does not smooth out, but sets with serrated or roughed surface. The reinforcing filler may contain coarse particles along with the very finest particles, for example mineral products such as silica sand containing particles from 20 to 300 mesh and finer may be used in varying quantities to give the paste characteristics desired for spreading on a paving base.

The acid curing agent consists of any of the acidic materials commonly used to cure furane resins to a solid state, including for examples hydrochloric acid, sulfuric acid, sulphonic acid, maleic anhydride, acid chloride salts, phosphoric acid, and mixtures of triphenyl phosphite with these and other acid curing agents.

The abrasive or wear-resisting surface particles which may be applied to the unset coating are relatively coarse mineral abrasive particles such as fused aluminum oxide and silicon carbide of silica, ceramic aggregates, and rock particles.

The following are typical examples of my coating compositions, all parts being by weight.

*Example 1*

100 parts by weight of a furane resin polymer mixture in proportions of 2 moles furfuryl alcohol to one of formaldehyde, 50 parts of chlorinated biphenyl having a high viscosity (not greater than 50,000 centipoises) and 70 parts of carbon black. This was mixed immediately before spreading as a coating on a paving base, with 2 to 6 parts by weight of sulfuric acid.

*Example 2*

100 parts by weight of a furane resin polymer in proportions of 2 moles furfuryl alcohol to 1 mole of furfuraldehyde pre-reacted to a viscosity of 1000 centipoises; 50 parts by weight of chlorinated biphenyl having a high viscosity (not greater than 50,000 centipoises) and 100 parts by weight of 20 to 60 mesh silica sand. This was mixed immediately before spreading as a coating on a paving base, with from 2 to 6 parts by weight of sulfuric acid.

*Example 3*

100 parts by weight of a furane resin polymer in proportions of 2 moles furfuryl alcohol to 1 mole of furfuraldehyde pre-reacted to a viscosity of 5000 centipoises; 25 parts by weight of chlorinated wax having a high viscosity of not more than 20,000 centipoises and 70 parts by weight of carbon black. This was mixed immediately before spreading as a coating on a paving base, with from 2 to 6 parts by weight of sulfuric acid.

*Example 4*

100 parts by weight of a furane resin polymer in proportions of 2 moles furfuryl alcohol to 1 mole of furfuraldehyde, pre-reacted to a viscosity of 1000 centipoises; 25 parts by weight of powdered chlorinated rubber (which produced a viscosity of about 5000 centipoises); and 70 parts by weight of carbon black. This was mixed immediately before spreading as a coating on a paving base, with from 2 to 6 parts by weight of 30 to 60 percent sulfuric acid.

Example 5

100 parts by weight of a furane resin polymer in proportions of equal moles of furfural and acetonyl acetone, reacted to a viscosity of about 1000 centipoises; 50 parts by weight of chlorinated biphenyl having a high viscosity (not greater than 50,000 centipoises); and 70 parts by weight of carbon black. This was mixed immediately before spreading as a coating on a paving base with from 2 to 6 parts by weight of sulfuric acid.

Example 6

100 parts by weight of a furane resin polymer in proportions of 1.1 moles of furfural to one mole of phenol reacted to a viscosity of about 1000 centipoises; 50 parts by weight of chlorinated biphenyl having a high viscosity (not greater than 50,000 centipoises); and 70 parts by weight of carbon black. This was mixed immediately before spreading as a coating on a paving base with from 2 to 6 parts by weight of sulfuric acid.

Example 7

100 parts by weight of a furane resin polymer in proportions of 2 moles of furfuryl alcohol to one mole of urea reacted to a viscosity of about 1000 centipoises; 50 parts by weight of chlorinated biphenyl having a high viscosity (not greater than 50,000 centipoises); and 70 parts by weight of carbon black. This was mixed immediately before spreading as a coating on a paving base with from 2 to 6 parts by weight of sulfuric acid.

Example 8

100 parts by weight of furfuryl alcohol polymerized to a viscosity of about 1000 centipoises; 50 parts by weight of chlorinated biphenyl having a high viscosity (not greater than 50,000 centipoises); and 70 parts by weight of carbon black. This was mixed immediately before spreading as a coating, on a paving base with from 2 to 6 parts by weight of 10 to 30 percent sulfuric acid.

Example 9

100 parts by weight of a furane resin polymer in proportions of 2 moles furfuryl alcohol to one mole of furfuraldehyde, pre-reacted to a viscosity of 1000 centipoises; 25 parts by weight of powdered chlorinated rubber (which produced a viscosity of about 5000 centipoises); 70 parts by weight of carbon black; and 100 parts by weight of 20 to 300 mesh silica sand. This was mixed immediately before spreading as a coating on a paving base with from 2 to 6 parts by weight of 30 to 60 percent sulfuric acid.

Example 10

The sand filler in the composition of Example 9 was increased by steps of 100 parts by weight of silica sand, up to a total of 500 parts by weight of sand, to give plastic to granular pastes which were spreadable on the paving base.

Example 11

100 parts by weight of a furane resin polymer in proportions of 2 moles furfuryl alcohol to one mole of furfuraldehyde, pre-reacted to a viscosity of 1000 centipoises; 50 parts by weight of the hydrocarbon residuum resulting from the furfuraldehyde extraction of butadiene; and 70 parts by weight of carbon black. This was mixed immediately before spreading as a coating on a paving base with from 2 to 6 parts by weight of 30 to 60 percent sulfuric acid.

The prepared furane composition containing mixed-in acid hardener may be spread on the paving by any suitable means such as by brushing or troweling. Spray coating may be employed, but dilution of the composition (for spraying) by any liquid which tends to dissolve an asphaltic paving surface is to be avoided. When my coating composition is applied by brushing or troweling, the surface may be roughened to improve the non-skid property thereof.

To further improve the non-skid property as well as the wear-resistance, of my coating, I may embed sand or gravel, including ceramic and abrasive particles such as emery, silicon carbide, aluminum oxide, glass powder, pottery grog, iron and chromium oxides, and other minerals of suitable small sizes (for example 8 to 40 mesh) in the coating surface after it has been spread out on the paving. An excess of sand and gravel or the like is spread on top of the non-hardened coating, and sometimes rolled in with a weighted roller. The particles embedded in my composition are held securely because of the wetting quality of the sunset furane resins therein, and because of the strength of adhesion after final cure.

The advantages of my composition and method will be apparent from the above description. The liquid furane resin polymers are particularly effective because they are readily plasticized and made thixotropic by the added fine powdered filler and the chlorinated hydrocarbon ingredients, and because furane resin bonds are inherently very strong and are not greatly affected by weathering, and are therefore permanent. The application of my coating securely fastens any loose mineral material on the paving surface, and also seals up cracks to prevent water penetration and damage by the freezing of such water.

I claim:

1. A pavement comprising a supporting asphaltic pavement base; and an upper wear-surface layer adhesively attached directly to said base, said wear-surface layer comprising a hardened resinous composition consisting essentially of a furane resin which had been pre-polymerized to a viscosity of from 20 to 1000 centipoises, an extender-plasticizer material dissolved in said furane resin prior to hardening, a finely divided reinforcing powder dispersed in said mixture of furane resin and extender-plasticizer prior to hardening, and, a separate ingredient to be added and mixed into said hardenable resinous composition immeditely prior to the application of said plastic composition to said pavement base, an acid catalyst for said furane resin; said hardened upper wear-surface layer being non-destructive to said asphaltic pavement base.

2. The pavement defined in claim 1, in which said hardened resinous composition also contains as an embedment on its wearing surface, particles of hard and wear-resistant mineral particles, said particles being wholly or partly covered by said resinous composition prior to its hardening.

3. The pavement defined in claim 1 in which said hardened resinous composition consists of 100 parts by weight of furane resin, 10 to 100 parts by weight of extender-plasticizer, and 10 to 500 parts by weight of reinforcing filler.

4. The pavement defined in claim 1 in which the furane resin polymer consists of from one to three moles of furfuryl alcohol to one mole of furfuraldehyde.

5. The pavement defined in claim 1 in which the furane resin polymer consists of from one to three moles of furfuryl alcohol to one mole of formaldehyde.

6. The pavement defined in claim 1 in which the furane resin polymer consists of furfuryl alcohol.

7. The pavement defined in claim 1 in which the furane resin polymer consists of furfuraldehyde and a ketone.

8. The pavement defined in claim 1 in which the furane resin polymer consists of furfuraldehyde and urea.

9. The pavement defined in claim 1, in which the extender-plasticizer is selected from the group consisting of halogenated waxes, halogenated diphenyl, halogenated rubbers, and the tarry residuum produced in the furfuraldehyde extractive purification of butadiene.

10. The pavement defined in claim 1, in which the extender-plasticizer is the tarry residuum produced in the furfuraldehyde extractive purification of butadiene.

11. The method of providing a pavement having a strong erosion-resistant wear surface bonded to a supporting asphaltic base comprising spreading over said supporting base a hardenable furane resin polymer composition consisting essentially of a liquid furane resin polymer pre-polymerized to a viscosity of from 20 to 1000 centipoises, a reinforcing filler, a plasticizer-extender, and an acidic hardening catalyst for said furane resin polymer in such proportions that said base is not chemically attached by said composition; and allowing said composition to harden in situ.

12. The method defined in claim 11 in which the furane resin polymer consists of mixture of from one to three moles of furfuryl alcohol to one mole of furfuraldehyde.

References Cited in the file of this patent

UNITED STATES PATENTS

| | | |
|---|---|---|
| 2,718,829 | Seymour | Sept. 27, 1955 |
| 2,925,831 | Welty | Feb. 23, 1960 |

OTHER REFERENCES

The Furans, Dunlap and Peters, 1953, by Reinhold, pp. 1–867.

The Condensed Chemical Dictionary, 5th edition, 1956, by Reinhold, p. 504.

Plasticizers, D. N. Buttrey, 2nd edition, pp. 110, 111, 121, 122, 1957, Cleaver-Hume Press.

Polymers and Resins, Golding, 1959, D. Van Nostrand Co., pp. 369, 370.